(12) United States Patent
Hsieh

(10) Patent No.: US 7,093,241 B2
(45) Date of Patent: Aug. 15, 2006

(54) METHOD FOR ELIMINATING REDUNDANT METHOD CALLS IN AN OBJECT ORIENTED PROGRAM

(75) Inventor: Hsien-Cheng E. Hsieh, deceased, late of Gold River, CA (US); by Chien-Yu Huang, legal representative, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 10/165,379

(22) Filed: Jun. 7, 2002

(65) Prior Publication Data

US 2003/0229887 A1    Dec. 11, 2003

(51) Int. Cl.
*G06F 9/45* (2006.01)
*G06F 9/44* (2006.01)

(52) U.S. Cl. .............. 717/153; 717/148; 717/151; 717/154; 717/116

(58) Field of Classification Search ............... 717/116, 717/148, 140, 108, 151, 166, 153; 706/47
See application file for complete search history.

(56) References Cited

U.S. PATENT DOCUMENTS

| 5,903,761 | A | 5/1999 | Tyma |
| 6,142,684 | A | 11/2000 | Kirshenbaum et al. |
| 6,230,311 | B1 | 5/2001 | Gerard et al. |
| 6,381,738 | B1 * | 4/2002 | Choi et al. ................. 717/140 |
| 2003/0149966 | A1 * | 8/2003 | McGuire .................... 717/148 |

OTHER PUBLICATIONS

Suganuma et al., "Overview of IBM Java Just-In-Time Compiler", Nov. 1, 2000, pp. 1-14 www.research.ibm.com/journal/sj/391/suganuma.html.*
Tamar Domani et al. "Implementing an on-the-fly garbage collector for Java", Oct. 2003, ACM SIGPLAN Notices, Proceedings of the 2$^{nd}$ international symposium on Memeory management ISMM '00, vol. 36, Issue 1, pp. 155-166.*

* cited by examiner

*Primary Examiner*—Wei Zhen
*Assistant Examiner*—Chih-Ching Chow
(74) *Attorney, Agent, or Firm*—Blakely, Sokoloff, Taylor & Zafman LLP

(57) ABSTRACT

A method and machine-readable medium provide flags to commonly derived objects so that redundant method calls are avoided.

14 Claims, 2 Drawing Sheets

```
1  Mark
2  if (object is an JAVA API) | | (object
3  modifies shared data)
4       object.attribute |=ROOT;
5  if (object is an leaf method)
6       object.attribute |= LEAF;

7  Catch exception
8  if (object catches exception)
9       if (object.attribute & LEAF)
10          Exception_caught = 1;

11 Propagate
12 if (object.attribute & ROOT)
13      if (Exception_caught == 1)
14          Raise exception;
```

US 7,093,241 B2

METHOD FOR ELIMINATING REDUNDANT METHOD CALLS IN AN OBJECT ORIENTED PROGRAM

FIELD OF INVENTION

The present invention relates to object oriented programming, and more specifically to efficient performance of processes repeated in related objects.

BACKGROUND OF THE INVENTION

Embodiments of the present invention are discussed in the context of JAVA class library performance. This is a very popular form of object-oriented programming (OOP) at the present time because it is applicable to forms of object-oriented programming. Like most object-oriented programming paradigms objects and methods are implemented to be self-contained. Therefore, when a second object is derived from a first object, and a third object is derived from a second object, as in the case of a JAVA string class and its parent classes, a process may be included in the subclasses which duplicates a function in the object in the parent class.

One example of such an operation is a function to check for a buffer overflow during execution. Normally, if a buffer will not overflow during execution of a subclass, it will not overflow during execution of the parent class (unless the buffer is explicitly modified). However, assuming a method of a derivative object uses a buffer to hold a context of a stream, the object will check buffer capacity before passing execution to the next higher level object. Consequently, excessive, redundant method calls will be inherent in JAVA class libraries. The excessive calls decrease JAVA performance and increase overhead. Data shows that excessive redundant method execution can degrade the performance of certain JAVA™ class library method calls by two times.

BRIEF DESCRIPTION OF THE DRAWINGS

Embodiments of the invention are described by way of exemplification in the following description taken in connection with the following drawings.

Of the drawings.

DETAILED DESCRIPTION OF THE INVENTION

Figure 1:
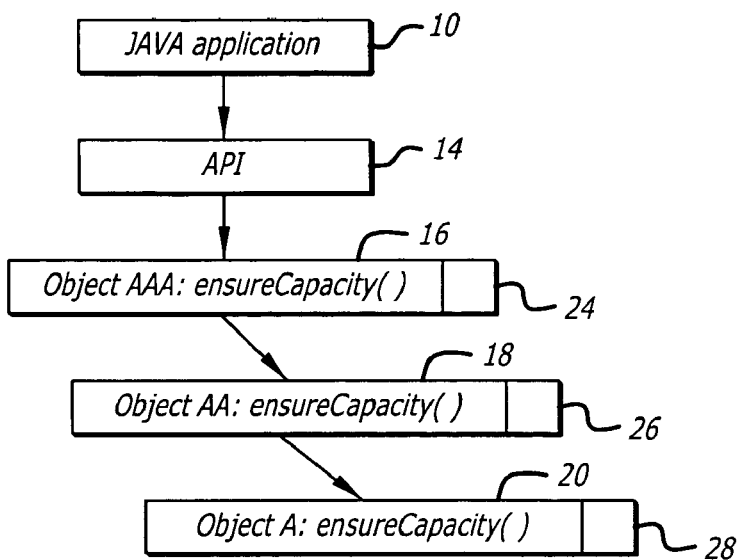
FIG. 1 is a block diagram illustrating operation of an object and parent objects within a JAVA application and further illustrating the position of a flag to each object field.

FIG. 1 is a block diagram of a JAVA application 10 through a JAVA application program interface (API)14. A second derivative object (AAA) 16 is derived from a first derivative object AA 18 which in turn is derived from a first object A20. The object AAA 16 and its parent classes will have methods in common. In this particular example, one of the methods of object AAA 16 uses a buffer to hold the contents of a string. In order to make proper use of the buffer, object AAA 16 checks buffer capacity before passing execution to object AA 18. Object AA 18 performs the same function before passing execution to object A 20 within its parent class. Object A 20 being the parent of AA 18, contains the same Ensure Capacity ( ) procedure. Objects AAA 16, AA 18 and A20 comprise sequences of objects derived from a common source library.

It is desirable to eliminate the redundant method call inherited from a parent class. In this particular example, the redundant process is checking buffer capacity, but the invention is applicable to eliminating other redundant processes called by related objects as well. In the absence of a method in which the buffer is going to be modified, check of buffer capacity for the execution of the method on the related objects need be performed only once.

Figure 2:
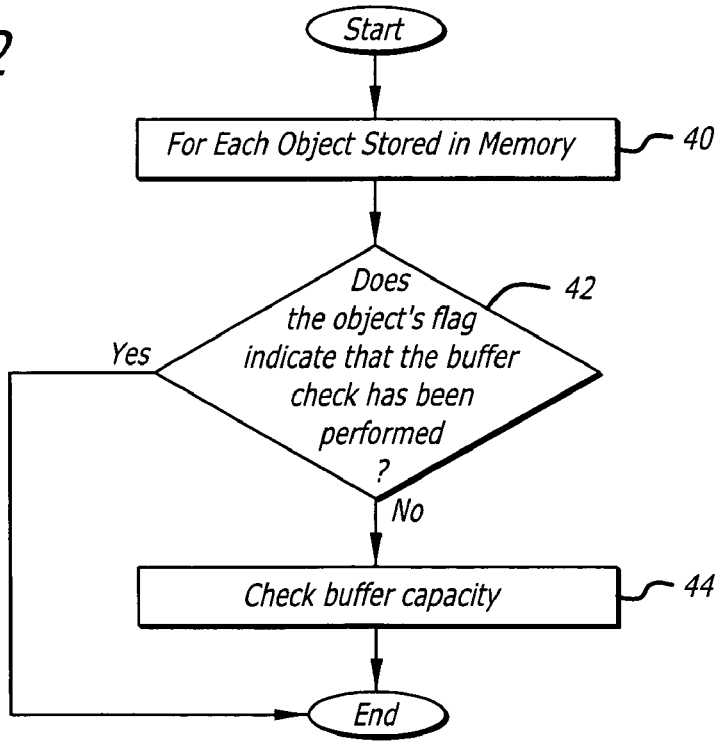
FIG. 2 is a block diagram illustrating operation of the embodiment of FIG. 1.
Figures 3, 4:
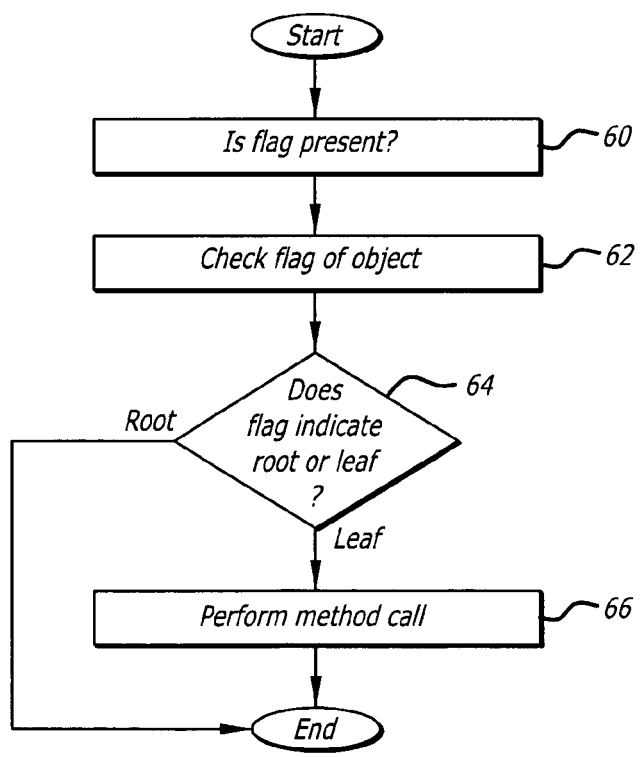
FIG. 3 is a JAVA code statement illustrative of a further embodiment of the present invention.
FIG. 4 is an flow chart of the operation of the embodiment of FIG. 3. of a method for dealing the check until as late as possible.

In order to inform the system of when the potentially redundant method calls are or are not necessary, information is provided. In one form of this implementation, the object AAA 16 is tagged with a define flag 24 and the object A 20 is tagged with a use flag 28. The object AA 18 may be tagged with a use flag 26. This operation is described with respect to FIG. 2, which is a flow chart. At block 40, the JAVA API 14 examines each successive related object, represented here for example by the objects 16, 18 and 20. At block 42, the API examines whether the object's flag indicates that a buffer check has been performed. If not, at block 44, the buffer check is performed. In this manner, redundant calls are prevented. FIG. 3 is an illustration of a further manner of eliminating redundant "ensure capacity" calls which is transparent to operation. FIG. 3 is a block of JAVA code illustrating a provision of the following constraints.

For each object, a pair of "root and leaf" flags is defined. The root flag is placed at the JAVA API entry point or in the last object that modifies the buffer. The leaf flag is placed at the leaf function that performs the last redundant check. During the execution of the API 14 to objects 16, 18 and 20 the redundant check is disabled at all objects except the leaf. The check is delayed until as late as possible. If an exception is established at the leaf, the actual signaling will happen at the root.

In the method as illustrated in FIG. 1, the root flag will be placed in object AAA 16 if object AA 18 does not modify the buffer. The root flag will be placed in object AA 18 if the buffer will be modified. A leaf flag is placed in object A 20. Checks are disabled at object AA 18 and AAA 16 but not object A 20. If an exception is raised during the execution of "ensure capacity" call (in object A 20, the exception will be recorded to have happened in object AAA 16.) The implementation of this technique is illustrated in FIG. 3 which represents code therefore. The program at line 2, determines if an object is a JAVA application program interface. In this case the object modifies shared data at line 3 of the code, the object attribute will be labeled as a root. If the object is not a JAVA API, then the object attribute is labeled as a leaf, as seen at the end of line 4. As seen at line 7, if the object catches an exception to the buffer capacity, the exception caught value is set to one. At lines 9 and 10, if the exception is caught, the objection is attributed to the root.

FIG. 4 is a flowchart illustrating the using of root/leaf pair inserted in class libraries. Block 60, at block 62, the flag is checked. Block 64 determines whether the flag is a root flag or a leaf flag. In the case of root flag, the performed method is not called and operation proceeds. In the case of a leaf flag, at block 66 the called method is performed and operation proceeds. In this embodiment using the illustration of FIG. 4, the flag 24 is the root flag, and the flag 28 is the leaf flag.

The present invention also comprises a machine-readable medium as a method. A machine-readable medium includes any mechanism that provides (i.e., stores and/or transmits information in a form readable by a machine (e.g., a computer)). For example, a machine-readable medium includes read only memory (ROM) random access memory (RAM); magnetic disk storage media; optical storage media; flash memory devices; electrical, optical, acoustical or other form of propagated signals (e.g., carrier waves, infrared signals, digital signals, etc.) and the like.

The invention is also used to construct efficient JAVA class libraries and enable increased performance. The above specification has been written with a view toward enabling those skilled in the art to make many departures from specific examples illustrated herein to produce the method and processor constructed in accordance with the present invention.

What is claimed is:

1. A computerized method comprising:
processing a group of objects in a sequence based on a single JAVA class library, each object comprising a method call, calling for a redundant process that is performed for all objects in the group of objects, the redundant process is a check of a buffer capacity; and
providing a first flag associated with a first object in a selected sequence of the group of objects for permitting the redundant process and a second flag in another object at another position in the sequence of objects for disabling the redundant process.

2. The computerized method according to claim 1, wherein the objects include a JAVA string class object and objects from parent classes of the object.

3. The computerized method according to claim 2 wherein providing the first flag comprises providing a "define" flag, and providing the second flag comprises providing a "use" flag, the first flag being provided in a first of the group of objects in sequence to be processed and the second flag in a last object in the sequence to be processed.

4. The computerized method according to claim 2 wherein the first flag and the second flag correspond to a root flag and a leaf flag, the root flag being placed at a first JAVA API entrance point of the group of objects to disable the redundant operation, and placing the leaf flag to perform a last call of the operation performed for all objects in the group.

5. The computerized method according to claim 4 wherein an exception is raised and further wherein the exception is reported as having happened at the object containing the root flag.

6. The computerized method according to claim 5 wherein the method comprises a check buffer method and wherein the flags indicate whether buffer capacity has been checked by a corresponding JAVA application.

7. A machine-readable storage medium that provides instructions which, when executed by a processor, cause the processor to perform operations comprising a method call, calling for an operation that is redundant performed for all objects in the group of objects, the operation being a check of a buffer capacity;

and providing a first flag associated with an object in a selected sequence of the group of objects for permitting the method call arid a second flag in another object at another position in the group of objects for disabling the method call.

8. A machine-readable storage medium according to claim 7 that provides instructions which, when executed by a processor, cause the processor to perform operations wherein the objects include a JAVA string class object and objects from parent classes of the object.

9. A machine-readable storage medium according to claim 8 that provides instructions which, when executed by a processor, a first flag comprising a "define" flag, and providing the second flag comprising a "use" flag, the first flag being provided in a first of the objects in sequence to be processed and the second flag in a last object in the sequence to be processed.

10. A machine-readable storage medium according to claim 8 that provides instructions which, when executed by a processor, when an exception is raised reporting the exception is as having happened at the object containing a root flag.

11. A machine-readable storage medium according to claim 10 that provides instructions which, when executed by a processor, the method comprises a check buffer method and wherein the flags indicate whether buffer capacity has been checked by a corresponding JAVA application.

12. A JAVA application program stored in memory and executed by a processor, the JAVA application program configured to processing a plurality of objects based on a single JAVA class library, each the object comprising a method call that calls for an operation that is redundantly performed for all objects in the group of objects, comprising:
a first object in a selected sequence of the plurality of objects, the first object including a first flag that, when set, permits the method call that is directed to a checking of a buffer capacity; and
a second abject in the selected sequence or the plurality of objects, the second object including a second flag that, when set, disables the method call.

13. The JAVA application program of claim 12 wherein the first and second objects include a JAVA string class object and objects from parent classes of the object.

14. The JAVA application program of claim 13 wherein the first and second flags indicate whether buffer capacity has been checked by a corresponding JAVA application.

* * * * *

UNITED STATES PATENT AND TRADEMARK OFFICE
CERTIFICATE OF CORRECTION

| | | |
|---|---|---|
| PATENT NO. | : 7,093,241 B1 | Page 1 of 1 |
| APPLICATION NO. | : 10/165379 | |
| DATED | : August 15, 2006 | |
| INVENTOR(S) | : Hsieh | |

It is certified that error appears in the above-identified patent and that said Letters Patent is hereby corrected as shown below:

In column 4, at line 7, delete "arid" and insert --and--.
In column 4, at line 42, delete "abject" and insert --object--.
In column 4, at line 42, delete "or" and insert --of--.

Signed and Sealed this

Sixth Day of November, 2007

JON W. DUDAS
*Director of the United States Patent and Trademark Office*